Oct. 25, 1960   C. M. ELLIOTT   2,957,466
SPEED SENSOR
Filed July 30, 1958   2 Sheets-Sheet 1
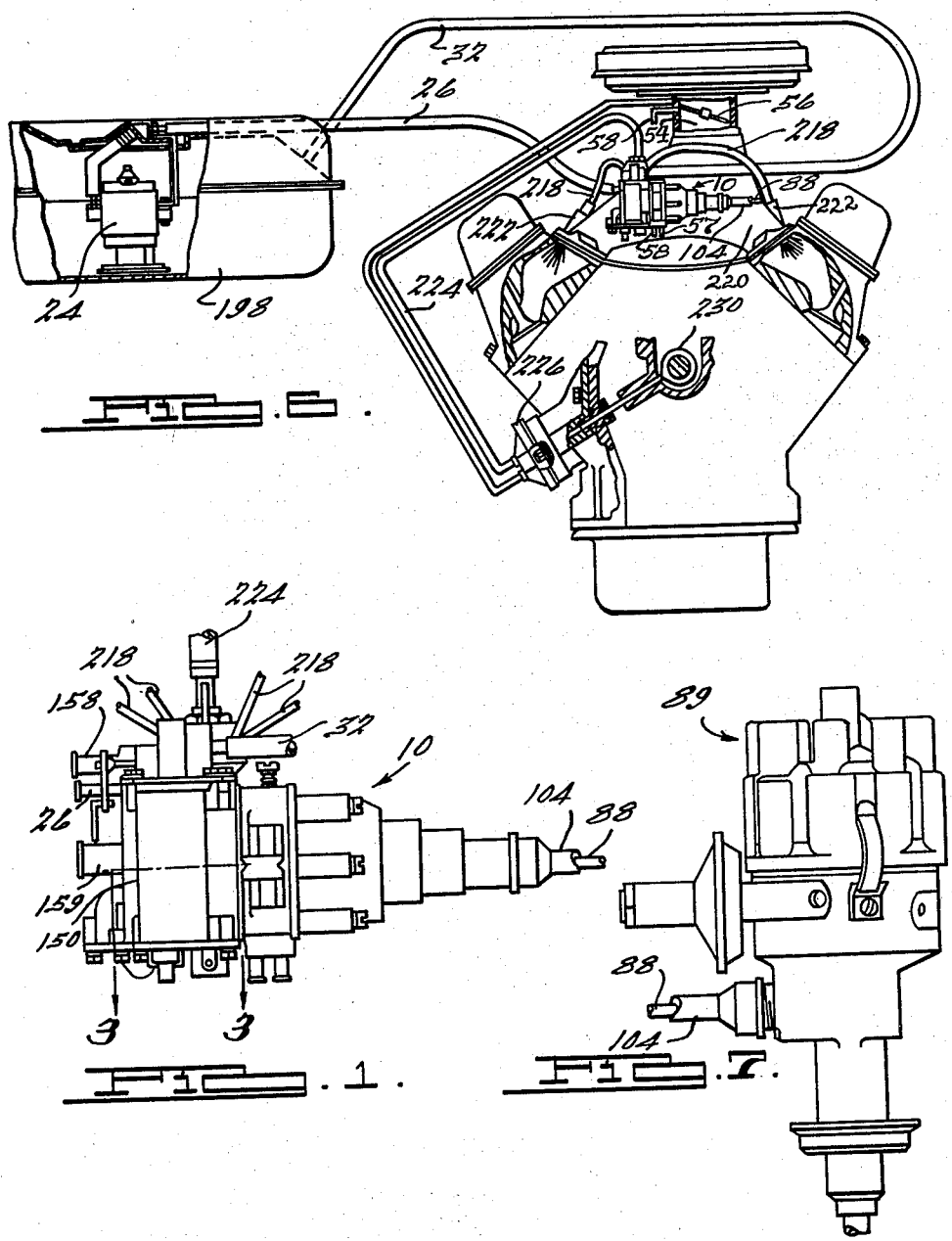
INVENTOR
CLIFTON M. ELLIOTT
By   Harwell and Harris
ATTORNEYS.

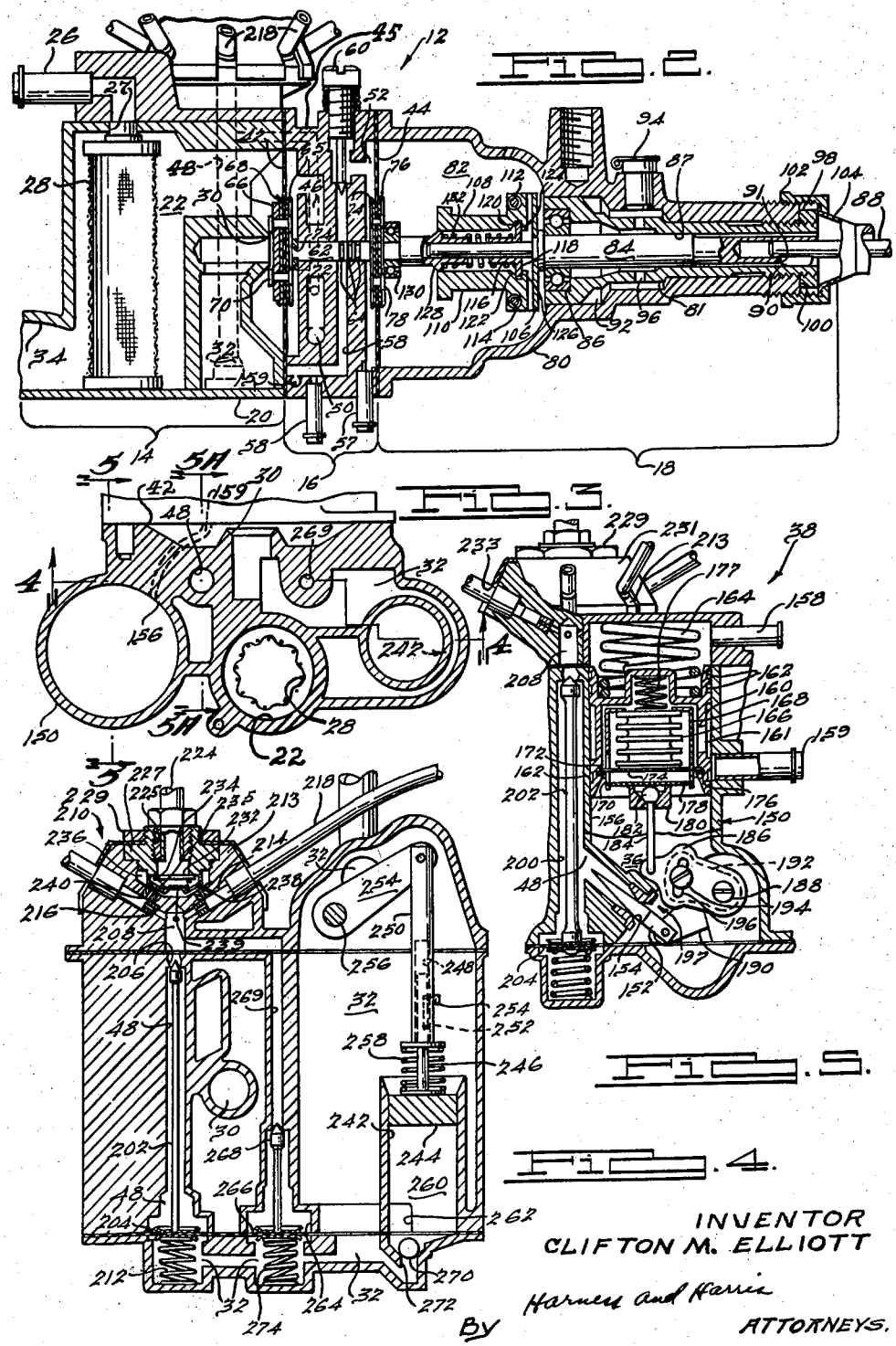

United States Patent Office 2,957,466
Patented Oct. 25, 1960

2,957,466

SPEED SENSOR

Clifton M. Elliott, Birmingham, Mich., assignor to Chrysler Corporation, Highland Park, Mich., a corporation of Delaware Filed July 30, 1958, Ser. No. 752,000

16 Claims. (Cl. 123—119)

This invention relates to a fuel injection system of the type disclosed in the following relating copending applications owned by applicant's assignee and having the following filing dates: Thomas M. Ball et al., Serial No. 751,999, filed July 30, 1958; Clifton M. Elliott, Serial No. 752,004, filed July 30, 1958; John W. Hurst, Serial No. 752,003, filed July 30, 1958; and Eugene P. Wise, Serial No. 752,005, filed July 30, 1958.

This invention relates in particular to a speed sensor for metering fuel to the cylinders of an internal combustion engine in amounts determined by engine speed. Although the invention is concerned mainly with automotive engines, it is anticipated that the disclosed type of fuel metering system and speed sensor may be used on other types of internal combustion engines.

It is conventional in fuel injection systems to supply fuel under pressure to a metering system which regulates the fuel flow to a number of fuel injection nozzles in accordance with the engine requirements. In such systems fuel is metered to a fuel distribution chamber through needle valve controlled metering orifices the size of which is subject to regulation by said engine requirements. Among the problems encountered by such systems utilizing said metering orifices is that of maintaining the proper fuel pressure drop across these orifices to provide a fuel flow to the nozzles in a controlled amount which is proportional to engine speed through the speed range of the engine. This problem arises from the facts that the fuel requirements of the engine throughout the speed range are proportional with respect to the engine speed since air flow to the engine is also proportional with respect to engine speed, and that the flow of fuel across the load metering orifice in the distribution chamber which feeds the nozzles is proportional to the square root of the pressure drop across said orifice. It is seen from these facts that the particular speed sensor or governor employed to regulate the fuel flow to the engine must be able to maintain throughout the speed range of the engine a pressure drop across the metering orifices which will allow the fuel flow thereacross to be proportional with respect to engine speed.

It is noted that the actual fuel requirements of the engine are not exactly linear with respect to engine speed over the engine speed range when ram type manifolds are used and the flow of fuel across the load metering orifice must be greater than linear at certain engine speeds when the ram effect is particularly noticeable.

It is an object of this invention to provide a speed sensor operative according to varying engine speed to produce a similarly varying pressure drop across a fuel metering orifice over the speed range of the engine, which varying pressure drop causes a fuel flow to the engine which is substantially constant proportionately to the air flow to the engine.

Another object is to provide a return flow and load fuel metering system with a speed sensor of the aforementioned type and operative to adjust the flow of return fuel to thereby maintain a pressure differential across a load metering orifice at all engine speeds sufficient to result in the proper flow of fuel across said load metering orifice with respect to engine air consumption.

Another object is to provide a speed sensor for use in a return flow metering system and capable of supplying proportionately more fuel to the engine at low speeds than at higher speeds to compensate for proportionately greater air consumption at said low speeds.

Another object is to provide a combined speed sensor and adjustable mounting therefor which mounting is particularly adapted for mounting said speed sensor in a fuel metering unit of a fuel injection system.

In carrying out this invention a fuel pump, usually located in the fuel tank and submerged in the fuel, is provided to supply fuel under substantially constant pressure to a speed chamber of the fuel metering unit. Communicating with the speed chamber of the metering unit across a load metering orifice is a fuel distribution chamber which receives the speed and load metered fuel and distributes it to the separate fuel injection nozzles for subsequent injection into the cylinders. A return flow fuel metering orifice is located in the speed chamber and communicates with the fuel tank through a return flow conduit. Cooperating with the return flow orifice to adjust the return flow according to engine speed is a shiftable valve member operatively associated with a flyweight governor which governor is operatively connected to the engine to shift said valve member a predetermined amount in response to a predetermined change in engine speed. The aforementioned non-linear relationship between engine speed and fuel requirements throughout a portion of the speed range is automatically compensated for in the construction of the particular governor means which forms a major feature of this invention and which is described in detail below.

Further objects and advantages of this invention will be apparent from the following detailed illustration thereof, reference being had to the accompanying drawings forming a part of this specification wherein like reference characters designate corresponding parts in the several views:

Fig. 1 is a side elevational view of the fuel injection metering unit;

Fig. 2 is substantially a vertical longitudinal mid-sectional view through the unit of Figure 1;

Fig. 3 is a horizontal sectional view of the unit taken on line 3—3 of Figure 1, and rotated counterclockwise 90°;

Fig. 4 is a vertical sectional view of the unit of Figure 1 taken along a line and in the direction corresponding to 4—4 of Figure 3;

Fig. 5 is a vertical sectional view of the load sensor of Figure 1 taken along a line corresponding to 5—5 of Figure 3 is the direction of the arrows with parts broken away to show a section of the load metering orifice of Figure 1 taken along a line corresponding to 5A—5A of Figure 3 in the direction of the arrows;

Fig. 6 is a view partly in cross section of the general arrangement of the fuel injection system and the engine; and Fig. 7 is a side elevational view of an automotive distributor for driving the unit of Figure 1.

Referring in detail to the drawings, and in particular to Figures 1 and 2, a fuel injection metering unit designated generally as 10 is provided with a speed sensor designated generally as 12. This speed sensor is conveniently divided into three sections, a speed section 14, an intermediate section 16, and a governor section 18. All three of these sections cooperate simultaneously to adjust the amount of fuel available to the engine in accordance with the fuel requirements of the engine as related to engine speed.

The speed section 14 comprises a housing 20 having a chamber 22 therein to receive a constant supply of fuel supplied under pressure by the pump 24 (Figure 6) through the fuel conduit 26. Pump 24 may be electrically driven and its operating speed is independent of engine speed. A fuel filter chamber 28 located in chamber 22 actually receives the fuel initially and after filtering said fuel discharges it into chamber 22. A return flow metering orifice 30 on housing 20 provides a passage from chamber 22 to a return flow conduit 32 which winds throughout the unit 10 and provides numerous chambers as shown in Figures 2, 4, and 5. A fuel outlet 34 in housing 20 communicates with an upstream chamber 36 of the load sensor 38 to enable fuel which has not been returned to the fuel source through return flow conduit 32 to flow into chamber 36 (Figures 2 and 3).

The intermediate section 16 of the speed sensor 12 is separated from the speed section 14 and the governor section 18 by diaphragms 42 and 44 respectively. This section is provided with a housing 45 having a chamber 46 which communicates with the downstream chamber 48 of the load sensor 38 through a conduit 50 to provide equal fuel pressures in chambers 46 and 48 for a purpose to be explained below.

A chamber 52 in section 16 communicates with an intake manifold 54 of the engine at a point adjacent the throttle valve 56 through conduit 58 (Figures 2 and 6) and provides a substantially constant low pressure to the diaphragm 44 when the engine is idling and also provides an increased pressure when the throttle 56 is opened (see Figure 6). Conduit 58 also serves to convey fuel passing the seals 64 to the intake manifold. An air bleed 57 which may be adjustable communicates with chamber 52 and allows air under atmospheric pressure to bleed into said chamber to partially offset the low pressure therein and provides a means for adjusting the idling speed of the engine. Bleed 57 may be of any conventional air valve structure. A conventional needle valve 60 threadably received in housing 45 and adjustable with respect to the opening of conduit 58 into chamber 52 provides a means to regulate the amount of vacuum transmitted to chamber 52 from the engine manifold in order to further regulate the idling speed of the engine.

The intake manifold 54 consists of a plurality of separate manifold conduits 55 which lead from a point adjacent the air throttle valve 56 to the separate cylinders of the engine. These separate manifold conduits 55 have a length sufficient to provide a harmonic resonant condition therein of the order obtainable by a passage whose length in inches is approximately $$\frac{72C}{N} \pm 3$$

where N is the engine speed in revolutions per minute at which the performance of the engine is to peak and C is the velocity of sound in feet per second in the intake passage under the temperature and pressure conditions expected. It is through the use of this type of manifold that the ram effect mentioned above occurs. Patent No. 2,791,205 discloses the ram type of manifold with which the speed sensor of this application is concerned.

Referring again to Figure 2, a fuel return flow metering shaft 62 slidably mounted in housing 45 and provided with sliding sealing rings 64 is secured at one end to diaphragm 42 and valve disc 66 by flanges 65 and 68 and rivets 70. Disc 66 is movable with shaft 62 toward orifice 30 to retard the flow of return fuel therethrough to return flow conduit 32. A split retaining ring 72 positioned in a circumferential groove 74 in shaft 62 provides a stop to prevent valve disc 66 from moving too far from orifice 30. The other end of shaft 62 is connected to diaphragm 44 by flanges 74 and 76 and rivets 78.

Governor section 18 of the speed sensor comprises a housing 80 having a chamber 82 therein communicating with one side of diaphragm 44. The pressure in this chamber is at all times atmospheric and therefore allows a pressure differential to exist across diaphragm 44, since chamber 52 communicates at all times with the low pressure portion of the engine intake manifold. A shaft 84 is rotatably mounted in a sleeve member 81 in housing 80 by ball bearing 86 and bearing surface 87 on mounting sleeve 81 and is keyed for rotation to a flexible drive shaft 88 of the engine distributor 89 (Figure 7) by key 90 on shaft 88 and slot 91 in shaft 84. The chamber 92 formed between sleeve 81 and housing 80 serves as a lubricating oil reservoir for ball bearing 86 and bearing surface 87. The oil is introduced into oil cup 94 and flows to said ball bearing and bearing surface through apertures 96 in sleeve 81.

Sleeve member 81 is threadably and adjustably received in the end of housing 80 and when finally adjusted axially of said housing 80 is secured against rotatable movement therein by lock nut 98 threadably received on said end of sleeve member 81 and threaded into tight engagement with the end face 100 of housing 80. A nut 102 is threadably received on the end of housing 80 and secures the flexible drive shaft covering 104 to said housing. A governor body 106 is secured to shaft 84 for rotation therewith and pivotally supports flyweights 108 and 110 on bearings 112 and 114 respectively. A thrust member or sleeve 116 having a flange 118 thereon is longitudinally slidably and rotatably mounted on a reduced portion of shaft 84 and slots 120 and 122 in flyweights 108 and 110 respectively loosely receive flange 118 of said sleeve which is abutted by shoulders 124 and 126 on flyweights 108 and 110 respectively. A reaction member or sleeve 128 also longitudinally slidably and rotatably mounted on said reduced portion of shaft 84 is adapted to abut at one end the inner race of a ball bearing 130. Said sleeve 128 mounts on its other end a spring 132 which resiliently urges said sleeves 116 and 128 apart and causes the outer race of ball bearing 130 to abut the heads of rivets 78 with sufficient force to prevent the outer race from rotating with the inner race and shaft 84. The rotation of shaft 84 in response to the rotation of the flexible drive shaft 88 causes the flyweights 108 and 110 to pivot outwardly from shaft 84 around bearings 112 and 114 respectively, which brings shoulders 124 and 126 of the flyweights into contact with the flange 118 of sleeve 116 and tends to urge the latter against spring 132. The force transmitted to spring 132 is transmitted through the connected diaphragms to the return flow metering valve disc 66 and tends to move said disc closer to orifice 30.

It is noted that the force output of a flyweight governor is mathematically speaking proportional to the square of the engine speed. Such a relationship between engine speed and force output, however, does not suffice for supplying fuel to the engine in accordance with the present metering unit since the air consumption of an internal combustion engine with respect to engine speed deviates from a linear relationship. This deviation is particularly noticeable in engines utilizing the ram type manfolds which manifolds are long enough to develop air pulsations therein which pulsations ram additional air into the engine cylinders and cause the engine to require more fuel to offset the leaning effect of the additional air. The relationship therefore between engine speed and governor force output is changed herein by the interposition of spring 132 between sleeves 116 and 128. This spring allows the radius of rotation of the centers of gravity of the flyweights to increase at a faster than normal rate with respect to engine speed over a portion of the speed range and to thereby exert a force on the spring, sleeve 128, and valve shaft 62 which force results in an increase in fuel flow to the engine over the amount which would flow at that speed in the absence of the spring. Spring 132 may also be designed to have a variable spring rate should it be desired to further vary the force output of the flyweights. At high speed ranges during which the proportion of air consumption to engine speed decreases due to a reduction in the ram effects at said speeds, the sleeves 116 and 128 will abut each other and the radius of rotation of the centers of gravity of the flyweights will increase with further increases in engine speed at the normal or lower rate. This reduced rate of said radius increase will result in the force output of the governor also increasing at said normal or lower rate with respect to said further increase in engine speed, which reduced rate of force output will result in a flow of fuel to the engine which corresponds more nearly to the linear air consumption of said engine at high speeds.

The specific structure of the load sensor 38 with which the fuel outlet 34 of chamber 22 communicates is known in Figure 3. The load sensor is conveniently divided into three sections for purposes of description. The first section 150 contains the mechanisms which are responsive to changes in manifold pressure and changes in atmospheric conditions to move through suitable linkages the load metering needle 152 with respect to the load metering orifice 154. This first section 150 comprises a cylinder 156 (Figures 3 and 5) having a manifold pressure inlet 158 which is operatively connected to the low pressure portion of the engine intake manifold. As shown in Figure 6, this portion may conveniently be chamber 54 which is downstream of primary throttle valve 56. A piston 160 having air sealing rings 162 thereon is reciprocably mounted in cylinder 156 and moves upwardly against spring 164 as the intake manifold pressure decreases. An air vent 159 communicating with conduit 58 in intermediate section 16 of the speed sensor (Figures 2 and 3) is provided in the housing of section 150 and allows atmospheric air to flow through slits 161 in the piston 160 and into contact with the exterior of air tight bellows 166 which is nested within the lower portion of piston 160. The low pressure in conduit 58 sucks a continuous flow of air past the bellows 166 which bellows expands lengthwise in response to either a drop in atmospheric pressure or an increase in atmospheric temperature and conversely contracts lengthwise in response to increased atmospheric pressure or decreased atmospheric temperature. Said bellows is secured at its top end to a shell 168 having a plurality of circumferentially spaced slots 170 therein through which slidably extend fingers 172 of plate 174 to which the lower end of bellows 166 is secured. Fingers 172 of plate 174 fit into grooves in the inner wall of piston 160 and are retained therein by split retaining ring 176. A spring 177 normally urges bellows 166 to a contracted condition. A plate 178 is secured to the lower end of shell 168 and carries a socket 180 into which a ball 182 of linkage member 184 is retained. Said linkage member is pivotally secured to arm 186 which is pivotally attached to one end of shaft 188 which shaft is rotatably mounted in the housing of section 150 and extends into chamber 36 of the second section 196 of the load sensor. An arm 190 secured to the other end of shaft 188 is pivotally connected to the load metering needle 152. An arm 192 secured to shaft 188 adjacent the arm 186 is provided with a set screw 194 which extends through slot 196 in arm 186. Arms 186 and 192 may be moved relative to each other when the set screw is loose to adjust the position of the metering needle 152 with respect to orifice 154 at any desired operating condition of the load sensor, after which the set screw is tightened.

The degree of taper of load metering needle 152, the length of the stroke of piston 160 and the size of load metering orifice 154 are interrelated and are specifically predetermined. These dimensions must be such that the flow of fuel across orifice 154 can always be adjusted by the load sensor over the speed range of the engine to be substantially linear with respect to the total air flow to the engine as measured by the load sensor.

The second section 197 of the load sensor is separated from the first section 150 by suitable walls and fluid tight seals which keep the fluid in upstream chamber 36 of section 197 from entering section 150. Chamber 36 receives its fuel supply from outlet 34 of chamber 22 of the speed section of the speed sensor which fuel represents the portion of the pumped fuel that is not returned to the fuel tank 198 (Figure 6) through the return flow conduit 32. Orifice 154 in the housing of chamber 136 opens into the downstream chamber 48 of the third section 200 of the load sensor. The total effect of the intake manifold pressure and the pressure and temperature of the atmosphere regulates the positioning of the metering needle 152 with respect to orifice 154 to control the flow of fuel therethrough into chamber 48.

Referring to Figures 3 and 4, a pressure valve needle 202 positioned in chamber 48 is attached to a diaphragm 204 and is normally urged to a closed position with respect to a fuel port 206 which communicates with the fuel distribution chamber 208 of rosette 210. The combined pressures exerted by the return fuel on conduit 32 and spring 212 urge needle 202 to its normally closed position. These pressures can be overcome by the pressure of the fuel flowing into chamber 48 when a predetermined minimum pressure of fuel in chamber 48 is attained. By establishing this minimum pressure in chamber 48 the formation of vapor in said chamber and in the rest of the system is retarded especially during starting and at slow engine speeds and the proper flow of fuel through the return flow conduit is insured since the resistance to said flow is overcome by the minimum pressure.

The rosette 210 in Figure 4 comprises a body 213 having a plurality of apertures 214 communicating with fuel chamber 208 across orifices 216. A nozzle feed conduit 218 is secured in each said aperture and communicates with a particular portion of the engine intake manifold 220 through a fuel injection nozzle 222 (Figure 6). An air conduit 224 has a threaded bushing 225 secured thereto which is threadably secured to body 213 by an intermediate valve carrying nut 227. A lock nut 229 secures the fuel feed conduit retaining plate 231 to the body 213 which plate urges the enlarged portions 233 of the nozzle feed conduits inwardly of the rosette to retain said conduits therein (see Fig. 5). Conduit 224 may be connected to an air pump 226 which is suitably mounted on the engine block 228 and actuated by the engine camshaft 230 (Figure 6). The use of this air pump is optional, however, a better control over the fuel atomization and dispersion has been obtained by using the pump and its use is advisable. A disc valve 232 normally urged against the inlet air port 234 of said rosette by spring 235 will prevent fuel from flowing onto conduit 224 should something happen to the system to cause the fuel in the nozzle feed conduits to back up through orifices 240. Slots 238 in a valve retaining plate 239 permit the air to flow into chamber 236 after it passes through port 234. Air chamber 236 communicates with each said aperture 214 across orifices 240. As the air flows across orifices 240 it mixes with the fuel flowing across orifices 216 and forms a liquid in air type dispersion which then flows through the nozzle feed conduits to the fuel injection nozzles. It is noted that the close proximity of the orifices 216 and 240 prevents collection of liquid fuel on the downstream side of orifice 216. The air orifices 240 should be larger than the fuel orifices 216 since at idle and low fuel consumption conditions the volume of air used greatly exceeds the volume of fuel used.

Referring further to Figure 4 a cylinder 242 positioned in the return flow conduit 32 slidably receives an accelerator piston 244. Attached to the piston is a shaft 246 which is slidably received in a recess 248 in shaft 250. A groove 252 in shaft 246 slidably receives a screw 254 which limits the longitudinal movement of the shaft 246 and attached piston 244. An arm 254 is secured to shaft 250 at one end and to shaft 256 at its other end, which shaft 256 is operatively connected to the engine accelerator pedal and rotates clockwise in response to the depression of the pedal to urge shaft 250 against spring 258 to move piston 244 downward. As said piston is moved downward it forces fuel trapped in accelerator chamber 260 through conduit 262 and into chamber 264 where it exerts a force on diaphragm 266. When the pressure exerted on said diaphragm by the accelerator pump reaches a predetermined minimum, needle valve 268 will open and allow accelerator fuel to flow directly through conduit 269 to chamber 208 of the rosette for distribution to the fuel injection nozzles. A ball check valve 270 separating the return flow conduit 32 from the accelerator chamber 260 is drawn upwardly from port 272 as piston 244 moves upwardly in response to engine deceleration and allows return fuel to fill chamber 260. The downward movement of piston 244 closes port 272 by forcing ball 270 into contact therewith. It is noted that a spring 274 and return fuel in return flow conduit 32 cooperate to urge diaphragm 266 and attached needle valve 268 to a closed position and establish the minimum pressure on diaphragm 266 which must be overcome by the pressure exerted by piston 244 on accelerator fuel within chamber 260 if acceleration fuel is to flow to the rosette. This accelerator pump is actuated in response to each depression of the accelerator pedal to deliver an extra amount of fuel to the engine while the rest of the fuel distribution system is catching up to the increased engine load condition. Without said pump the rapid increase in air flow into the intake manifold as the throttle is opened would cause a lean air-fuel mixture and result in "coughing" and "spitting" of the engine.

The operation of the fuel injection metering unit 10 will be described in relation to a change in static engine operating conditions, that is, constant engine speed and load. Under said static operating conditions, the combined forces exerted by flyweights 108 and 110, the spring 132, and the fuel in chamber 46 is balanced by the force exerted by the fuel in chamber 22 and the return flow metering disc 66 is maintained stationary at a distance away from orifice 30. In this static condition, the amount of fuel delivered to the rosette distributing chamber 208 is constant and is equal to the constant amount of fuel being delivered to the system by the pump less the constant amount of fuel being returned to the fuel tank through the return flow conduit 32. If this static condition represents the engine during normal driving speed, the pressure in chamber 52 has no noticeable effect on the operation of the unit and may be disregarded. It is only during idling and very low engine speeds that the pressure differential across diaphragm 44 becomes significant.

As the throttle valve 56 is moved to a more open position by depression of the engine accelerator, an increase in manifold pressure is transmitted to the load sensor piston through conduit 158 and moves said piston down to thereby move the load metering needle 152 to a more open position with respect to the load metering orifice 154. The pressure differential existing across said orifice is consequently decreased as more fuel is allowed to flow into chamber 48. This decrease in pressure differential causes the flow through orifice 154 to deviate from the desirable flow which is substantially directly proportional to engine speed. To correct this condition and bring the pressure differential across said orifice up to a value where the flow of fuel therethrough is substantially directly proportional to engine air consumption, the fuel pressure in speed chamber 22 and load sensor chamber 36 communicating therewith is increased. This increase in pressure is accomplished by moving the return flow metering valve disc 66 closer to orifice 30 by the increased force transmitted by the flyweights 108 and 119 and spring 132 as the engine speed is increased and by the increased pressure in chamber 46 caused by the increased flow of fuel into the downstream chamber 48 of the load sensor. When the forces transmitted by said flyweights, said spring, and the fuel in said chamber 46 once again balance the force transmitted in the opposite direction by the fuel in chamber 22, the flow of fuel through orifice 154 will be proportional to the speed of the engine and will correspond in substantially a direct proportion to the flow of air into the intake manifold.

I claim:

1. A governor mechanism comprising rotatable flyweight means having a center of gravity shiftable radially of the axis of rotation of said means in response to rotation thereof about said axis, said flyweight means also having a force transmitting portion, thrust means operatively associated with said portion and movable in response to radial shifting of said center of gravity against an opposing force, reaction means movable with respect to said thrust means, force transmitting means operatively connecting said thrust means and said reaction means for moving the latter responsive to shifting of said center of gravity of said flyweight means, said force transmitting means being variably yieldable to allow variable rate radial shifting of said center of gravity in response to changes in the speed of rotation of said flyweight means about said axis to thereby vary the rate at which the force output of the flyweight means changes with respect to said changes in the speed of said rotation, said force transmitting means being adapted to allow said thrust means and said reaction means to abut each other at a predetermined speed of rotation of said governor mechanism.

2. A governor mechanism comprising rotatable flyweight means having a center of gravity shiftable radially of the axis of rotation of said means in response to rotation thereof about said axis, said flyweight means also having a force transmitting portion, thrust means operatively associated with said portion and movable against an opposing force in response to radial shifting of said center of gravity, reaction means movable with respect to said thrust means, force transmitting means operatively connecting said thrust means and said reaction means for moving the latter responsive to shifting of said center of gravity of said flyweight means, said force transmitting means being resiliently yieldable to enable variable rate radial shifting of said center of gravity relative to changes in the speed of rotation of said flyweight means, thereby to vary in a predetermined manner the rate at which the force output of the flyweight means changes with respect to changes in the speed of rotation of said flyweight means about said axis, said force transmitting means being adapted to allow said thrust means and said reaction means to abut each other at a predetermined speed of rotation of said governor mechanism.

3. A governor mechanism comprising a rotatable governor body, flyweight means pivotally mounted on said body and rotatable therewith and having a center of gravity shiftable radially of the axis of rotation of said means in response to rotation thereof about said axis, said flyweight means also having a force transmitting portion, thrust means operatively associated with said portion and movable against an opposing force in response to radial shifting of said center of gravity, reaction means movable with respect to said thrust means and spaced therefrom, said reaction means and said thrust means being adapted to engage each other at a predetermined position of said center of gravity with respect to said axis of rotation, force transmitting means operatively connecting said thrust means and said reaction means for moving the latter responsive to shifting of said center of gravity of said flyweight means, said force transmitting means being resiliently yieldable to enable radial shifting of said center of gravity relative to movement of said thrust means and to enable said reaction means and said thrust means to engage each other as aforesaid, thereby to vary in a predetermined manner the rate at which the force output of the flyweight means changes with respect to changes in the speed of rotation of said flyweight means about said axis, said force transmitting means being adapted to allow said thrust means and said reaction means to abut each other at a predetermined speed of rotation of said governor mechanism.

4. A governor mechanism comprising a rotatable governor body, flyweight means pivotally mounted on said body and rotatable therewith and having a center of gravity shiftable radially of the axis of rotation of said means in response to rotation thereof about said axis, said flyweight means also having a force transmitting portion, thrust means operatively associated with said portion and movable against an opposing force in response to radial shifting of said center of gravity, reaction means movable with respect to said thrust means and spaced therefrom, said reaction means and thrust means being adapted to engage each other at a predetermined position of said center of gravity with respect to said axis of rotation, force transmitting means operatively connecting said thrust means and said reaction means for moving the latter responsive to shifting of said center of gravity of said flyweight means, said force transmitting means being a flexible member having a variable spring rate to enable variable rate radial shifting of said center of gravity relative to movement of said thrust means and to enable said reaction means and said thrust means to engage each other as aforesaid, thereby to vary in a predetermined manner the rate at which the force output of the flyweight means changes with respect to changes in the speed of rotation of said flyweight means about said axis.

5. A governor mechanism for a speed metering unit of a fuel injection system for an internal combustion engine, said engine having a ram type intake manifold, said unit having a fuel metering valve, said mechanism comprising rotatable flyweight means having a center of gravity shiftable radially of the axis of rotation of said means in response to rotation thereof about said axis, said flyweight means also having a force transmitting portion, thrust means operatively associated with said portion and movable in response to radial shifting of said center of gravity against an opposing force, reaction means movable with respect to said thrust means and adapted to be operatively connected to said fuel metering valve for regulating same in response to the force output of said flyweight means, force transmitting means operatively connecting said thrust means and said reaction means for moving the latter responsive to shifting of said center of gravity of said flyweight means, said force transmitting means being variably yieldable to allow variable rate radial shifting of said center of gravity in response to changes in the speed of rotation of said flyweight means about said axis to thereby vary the rate at which the force output of the flyweight means changes with respect to said changes in the speed of said rotation, said force transmitting means being adapted to allow said thrust means and said reaction means to abut each other at a predetermined speed of rotation of said governor mechanism.

6. In a speed sensor of a fuel metering unit of an internal combustion engine, said engine having a ram type intake manifold, said sensor having a governor housing and a fuel metering valve communicating with said housing and a fuel source, a speed sensitive governor means in said housing comprising a mounting sleeve having means thereon for adjusting said sleeve axially of said housing, bearing means on said sleeve, a shaft mounted in said sleeve in contact with said bearing means and rotatable thereon, said shaft being adapted for connection to a drive portion of said engine to rotate therewith, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, abutment means on said weight means, a thrust member slidably mounted on said portion of said shaft and having means thereon adapted to be engaged by said abutment means on said weight means as said weight means pivot outwardly in response to rotation of said shaft, a reaction member slidably mounted on said portion of said shaft and normally spaced from said thrust member, a helical spring member interposed between said thrust and said reaction members urging said members apart, the pitch of said spring member being such as to allow said spring to be compressed to a degree which will allow said thrust and said reaction members to abut each other at a predetermined engine speed.

7. In a speed sensor of a fuel metering unit of an internal combustion engine, said engine having a ram type intake manifold, said sensor having a governor housing and a fuel metering valve communicating with said housing and a fuel source, a speed sensitive governor means in said housing comprising a mounting sleeve having means thereon for adjusting said sleeve axially of said housing, bearing means on said sleeve, a shaft mounted in said sleeve in contact with said bearing means and rotatable thereon, said shaft being adapted for connection to a drive portion of said engine to rotate therewith, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, abutment means on said weight means, a thrust member slidably mounted on said portion of said shaft and having means thereon adapted to be engaged by said abutment means on said weight means as said weight means pivot outwardly in response to rotation of said shaft, a reaction member slidably mounted on said portion of said shaft and normally spaced from said thrust member, a helical spring member interposed between said thrust and said reaction members urging said members apart, the pitch of said spring member being such as to allow said spring to be compressed to a degree which will allow said thrust and said reaction members to abut each other at a predetermined engine speed, and said spring member having a variable spring rate to vary the rate at which said weight means pivot outwardly from said shaft in response to rotation thereof at engine speeds below said predetermined engine speed.

8. In a speed sensor of a fuel metering unit of an internal combustion engine, said sensor having a governor housing and a fuel metering valve communicating with said housing and a fuel source, a speed sensitive governor means in said housing comprising a mounting sleeve having means thereon for adjusting said sleeve axially of said housing, bearing means on said sleeve, a shaft mounted in said sleeve in contact with said bearing means and rotatable thereon, said shaft being adapted for connection to a drive portion of said engine to rotate therewith, a portion of said shaft extending outwardly from said mounting sleeve, a governor body secured to said portion of said shaft and rotatable therewith, flyweight means pivotally mounted on said body and rotatable therewith, said flyweight means having a center of gravity shiftable radially of the axis of rotation of said means in response to rotation thereof about said axis, said flyweight means also having a force transmitting portion, thrust means operatively associated with said portion and movable against an opposing force in response to radial shifting of said center of gravity, reaction means movable with respect to said thrust means, force transmitting means operatively connecting said thrust means and said reaction means for moving the latter responsive to shifting of said center of gravity of said flyweight means, said force transmitting means being variably yieldable to enable variably rate radial shifting of said center of gravity in response to changes in the speed of rotation of said flyweight means about said axis to thereby vary the rate at which the force output of the flyweight means changes with respect to said changes in the speed of rotation of said flyweight means.

9. In a speed sensor of a fuel metering unit of an internal combustion engine, a governor housing forming a portion of said sensor, a speed sensitive governor means in said housing comprising a mounting sleeve having means thereon for adjusting said sleeve axially of said housing, bearing means on said sleeve, a shaft mounted in said sleeve in contact with said bearing means and rotatable thereon, said shaft being adapted for connection to said engine to rotate at a speed proportional to engine speed, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, thrust means slidably mounted on said shaft and adapted to be engaged and moved by said weight means as said weight means pivot outwardly in response to rotation of said shaft, reaction means slidably mounted on said shaft and normally spaced from said thrust means, and force transmission means on said shaft associated with said thrust means and said reaction means to cause the force output of said weight means to be transmitted to said reaction means and to cause said force output to increase at a variable rate with respect to changes in engine speed.

10. In a speed sensor of a fuel metering unit of an internal combustion engine, a governor housing forming a portion of said sensor, a speed sensitive governor means in said housing comprising a mounting sleeve having means thereon for adjusting said sleeve axially of said housing, bearing means on said sleeve, a shaft mounted in said sleeve in contact with said bearing means and rotatable thereon, said shaft being adapted for connection to said engine to rotate at a speed proportional to engine speed, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, thrust means slidably mounted on said shaft and adapted to be engaged and moved by said weight means as said weight means pivot outwardly in response to rotation of said shaft, reaction means slidably mounted on said shaft and normally spaced from said thrust means, and force transmission means on said shaft associated with said thrust means and said reaction means to cause the force output of said weight means to be transmitted to said reaction means and to cause said force output to increase at a variable rate with respect to changes in engine speed, said force transmission means being a flexible member having a variable spring rate.

11. A speed sensor for a fuel metering unit for use in a fuel injection system of an internal combustion engine, said metering unit having a fuel metering orifice and a fuel metering member shiftable with respect to said orifice to control the flow of fuel therethrough, said speed sensor comprising a governor housing having flexible means thereon communicating with said fuel metering member, said housing having a threaded portion thereon, a speed sensitive governor means in said housing comprising a mounting sleeve having threaded means thereon engageable by said threaded portion of said governor housing for adjusting said mounting sleeve axially of said housing and with respect to said flexible means, longitudinally fixed bearing means in said sleeve, a shaft longitudinally fixed in said sleeve in contact with said bearing means and rotatable thereon, said shaft being adjustable axially of said housing simultaneously with the axial adjustment of said sleeve, a portion of said shaft extending outwardly from said mounting sleeve toward said flexible means, a governor body secured to said portion of said shaft and rotatable therewith, weight means pivotally mounted on said governor body and responsive to rotation of said body and shaft to pivot outwardly from said shaft, force means on said weight means for exerting a force axially of said shaft in the direction of said flexible means in response to the outward pivoting of said weight means, resilient means slidably mounted on said shaft adjacent said weight means and adapted to be engaged by said force means and moved against said flexible means as said weight means pivot outwardly in response to rotation of said shaft.

12. A speed sensor for a fuel metering unit for use in a fuel injection system of an internal combustion engine, said metering unit having a fuel metering orifice and a fuel metering member shiftable with respect to said orifice to control the flow of fuel therethrough, said speed sensor comprising a governor housing having flexible means thereon communicating with said fuel metering member, said housing having a threaded portion thereon, a speed sensitive governor means in said housing comprising a mounting sleeve having threaded means thereon engageable by said threaded portion of said governor housing for adjusting said mounting sleeve axially of said housing and with respect to said flexible means, longitudinally fixed bearing means in said sleeve, a shaft longitudinally fixed in said sleeve in contact with said bearing means and rotatable thereon, said shaft being adjustable axially of said housing simultaneously with the axial adjustment of said sleeve, a portion of said shaft extending outwardly from said mounting sleeve toward said flexible means, a governor body secured to said portion of said shaft and rotatable therewith, weight means pivotally mounted on said governor body and responsive to rotation of said body and shaft to pivot outwardly from said shaft, force means on said weight means for exerting a force axially of said shaft in the direction of said flexible means in response to the outward pivoting of said weight means, resilient means slidably mounted on said shaft adjacent said weight means and adapted to be engaged by said force means and moved against said flexible means as said weight means pivot outwardly in response to rotation of said shaft, said resilient means comprising a first sleeve and a second sleeve slidably mounted on said shaft and spring means urging said sleeves apart, said spring means being compressible to allow said sleeves to abut each other at a predetermined force output of said weight means.

13. A speed sensor for a fuel metering system of an internal combustion engine, said fuel metering system having a fuel metering orifice and a fuel metering member associated therewith, said speed sensor comprising a governor housing, a governor mounting sleeve in said housing, said mounting sleeve and said housing having cooperating means thereon for adjusting said sleeve axially of said housing, bearing means on the inner surface of said sleeve, a shaft mounted in said sleeve in contact with said bearing means and rotatable thereon, means on said shaft to prevent axial movement thereof with respect to said sleeve, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, shoulders on said weight means movable substantially axially of said shaft on said weight means pivot outwardly, thrust means slidably mounted on said shaft and adapted to be engaged by said shoulders and moved axially thereby as said weight means pivot outwardly in response to rotation of said shaft, reaction means slidably mounted on said shaft, and resilient means urging said thrust means and said reaction means apart, and adapted to exert an axial force on said fuel metering member in response to rotation of said shaft, said resilient means being compressible at a variable rate by the axial force developed by said weight means.

14. In a fuel metering unit of a fuel injection system of an internal combustion engine, said unit having a fuel metering orifice and a fuel metering member shiftable with respect to said orifice to control the flow of fuel therethrough, a speed sensor comprising a governor housing having a threaded portion, a mounting sleeve in said housing and having threaded means thereon mating with said threaded portion for adjusting said sleeve axially of said housing, bearing means internally of said sleeve, a shaft mounted in said sleeve in contact with said bearing means and rotatable thereon, said shaft having means thereon for connection to a drive portion of said engine, a portion of said shaft extending outwardly from said mounting sleeve, a governor body secured to said portion of said shaft and rotatable therewith, weight means pivotally mounted on said governor body and responsive to rotation of said body and shaft to pivot outwardly from said shaft, shoulders on said weight means movable substantially axially of said shaft as said weight means pivot outwardly, thrust means slidably mounted on said portion of said shaft, said thrust means having an abutment flange thereon adapted to be engaged by said shoulders of said weight means as said weight means pivots outwardly in response to rotation of said shaft, the engagement of said flange by said shoulders causing axial movement of said thrust member, reaction means slidably mounted on said portion of said shaft in normally spaced relationship to said thrust member, said reaction member adapted for connection to said fuel metering member for shifting the same with respect to said orifice in response to changes in engine speed, resilient means on said shaft urging said thrust member and said reaction member apart, said resilient means being compressible to allow said reaction means and said thrust means to abut at a predetermined engine speed.

15. In a fuel metering unit for a fuel injection system of an internal combustion engine, said unit having a return flow metering orifice and a return flow metering member shiftable with respect to said orifice to control the flow of return fuel therethrough, a speed sensor having a shaft adapted to be operatively connected to said engine to rotate at a speed directly proportional thereto, a governor body fixed to said shaft for rotation therewith, a pair of flyweights pivotally mounted on opposite sides of said governor body, each of said flyweights having a shoulder thereon and being responsive to rotation of said shaft to pivot outwardly from said shaft, a first sleeve slidably and rotatably mounted on said shaft and having a flange adjacent the shoulders of said pair of flyweights and engageable thereby as said flyweights pivot outwardly in response to the rotation of said shaft, said engagement of said sleeve by said flyweights causing said sleeve to slide longitudinally of said shaft, a second sleeve slidably and rotatably mounted on said shaft and urged from said first sleeve by a spring, said second sleeve adapted to abut said return flow metering member to resiliently shift said member toward said return flow metering orifice as said flyweights pivot outwardly in response to an increase in engine speed.

16. In a fuel metering unit for a fuel injection system of an internal combustion engine, said unit having a return flow metering orifice and a return flow metering member shiftable with respect to said orifice to control the flow of return fuel therethrough, a speed sensor having a shaft adapted to be operatively connected to said engine to rotate at a speed proportional thereto, a governor body fixed to said shaft and rotatable therewith, a pair of flyweights pivotally mounted on opposite sides of said governor body, each of said flyweights having a shoulder thereon and being responsive to rotation of said shaft to pivot outwardly from said shaft, a first sleeve slidably and rotatably mounted on said shaft and having a flange adjacent the shoulders of said pair of flyweights and engageable thereby as said flyweights pivot outwardly in response to the rotation of said shaft, said engagement of said sleeve by said flyweights causing said sleeve to slide longitudinally of said shaft, and a second sleeve slidably and rotatably mounted on said shaft and spaced from said first sleeve, a spring member urging said sleeves apart and compressible to allow said sleeves to abut at a predetermined position of said flyweights, said second sleeve adapted to abut said return flow metering member to resiliently shift said fuel metering member with respect to said return flow metering orifice as said flyweights pivot outwardly in response to an increase in engine speed.

References Cited in the file of this patent

UNITED STATES PATENTS 2,237,799    Van Nest _____ Apr. 8, 1941

UNITED STATES PATENT OFFICE

CERTIFICATION OF CORRECTION

Patent No. 2,957,466                          October 25, 1960

Clifton M. Elliott

It is hereby certified that error appears in the above numbered patent requiring correction and that the said Letters Patent should read as corrected below.

Column 2, line 53, for "is" read -- in --; column 3, line 32, after "be" insert -- made --.

Signed and sealed this 25th day of April 1961.

(SEAL)
Attest:

ERNEST W. SWIDER                                    DAVID L. LADD
Attesting Officer                                        Commissioner of Patents